(12) United States Patent
Liang et al.

(10) Patent No.: US 9,152,169 B2
(45) Date of Patent: Oct. 6, 2015

(54) HINGE STRUCTURE AND ELECTRONIC DEVICE HAVING THE SAME

(71) Applicant: Wistron Corporation, New Taipei (TW)

(72) Inventors: Chen-Yi Liang, New Taipei (TW); Chun-Chien Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 155 days.

(21) Appl. No.: 14/146,001

(22) Filed: Jan. 1, 2014

(65) Prior Publication Data
US 2015/0089770 A1   Apr. 2, 2015

(30) Foreign Application Priority Data

Oct. 2, 2013   (TW) .............................. 102135757 A (51) Int. Cl.
    *G06F 1/16*   (2006.01)
(52) U.S. Cl.
    CPC ....................................... *G06F 1/16* (2013.01)
(58) Field of Classification Search
    USPC .......... 345/173, 184, 1.1, 156, 169, 175, 633, 345/684, 629; 312/223.2, 223.1, 223.3, 312/249.11, 245, 295, 348.4, 236, 317.1, 312/326; 361/753, 755, 679.01, 679.27, 361/679.26, 679.09, 679.41, 679.3, 679.08, 361/679.4, 679.07, 679.55, 679.21, 679.59, 361/679.28, 679.23; 455/575.1, 575.8, 455/575.3, 575.4, 566, 569.2, 74.1, 418, 455/41.1, 572, 573; 16/342, 321, 371, 370, 16/366, 325, 275, 277, 297, 382, 354, 367, 16/344, 308, 50, 319, 341, 221; 439/358, 439/626, 517, 165, 10
    See application file for complete search history.

(56) References Cited

U.S. PATENT DOCUMENTS

| | | | |
|---|---|---|---|
| 7,543,358 B2 | 6/2009 | Lin et al. | |
| 2005/0101358 A1* | 5/2005 | Carpenter | ................... 455/575.1 |
| 2013/0063911 A1* | 3/2013 | Shoji et al. | ..................... 361/755 |
| 2013/0109447 A1* | 5/2013 | Sakamoto et al. | .......... 455/575.1 |
| 2014/0036423 A1* | 2/2014 | Tanaka | ...................... 361/679.01 |

\* cited by examiner

*Primary Examiner* — Hung Duong
(74) *Attorney, Agent, or Firm* — Jianq Chyun IP Office (57) ABSTRACT

A hinge structure adapted to an electronic device is provided. The electronic device includes a first body, a second body, a first cable and a second cable. The hinge structure includes a first hinge, a second hinge, a first electrical connection element and a second electrical connection element. The first hinge is fixed at the first body. The second hinge is fixed at the second body and pivoted to the first hinge along an axis. The second electrical connection element is rotatably connected to the first electrical connection element along the axis. The first cable is connected between the first body and the first electrical connection element, and the second cable is connected between the second body and the second electrical connection element.

20 Claims, 11 Drawing Sheets

HINGE STRUCTURE AND ELECTRONIC DEVICE HAVING THE SAME

CROSS-REFERENCE TO RELATED APPLICATION

This application claims the priority benefit of Taiwan application serial no. 102135757, filed on Oct. 2, 2013. The entirety of the above-mentioned patent application is hereby incorporated by reference herein and made a part of this specification.

BACKGROUND

1. Field of the Application

The invention relates to a hinge structure and an electronic device having the same, and more particularly, to a hinge structure including electrical connection elements and an electronic device having the same.

2. Description of Related Art

Benefiting from the progress of semiconductor devices and display technology, electronic devices continue to develop toward directions of small size, versatile functions and easy carrying. Common portable electronic devices include tablet PC, smart phone, and notebook computer. Taking the notebook computer for instance, it is mostly composed by assembling a host and a display that are pivotally connected to each other. A user may close the notebook computer through the relative rotation between the host and the display for easy carrying, and then the user may open the notebook computer for performing operation when desired.

In general, the host and the display of the notebook computer are configured with a hinge therebetween, so that the host and the display are adapted to rotate in relative to each other to be opened or closed through the hinge, and a cable of the notebook computer can be connected between the host and the display through the hinge. In the process of assembling the cable, the cable often has to be bended several times in the vicinity of the hinge so as to be fixed, and this usually increases the difficulty in assembling and dissembling the cable. In addition, when the host and the display are to rotate in relative to each other through the hinge, the cable is easily being damaged or cracked due to being pulled, twisted or rubbed against other components, and if an angle of relative rotation between the host and the display is too large, the cable may easily be cracked.

SUMMARY OF THE APPLICATION

The invention provides a hinge structure and an electronic device having the same, which are able to prevent cables from being damaged or cracked due to rotation of the body of the electronic device.

The hinge structure of the invention includes a first hinge, a second hinge, a first electrical connection element and a second electrical connection element. The first hinge has a first accommodating space. The second hinge is pivoted to the first hinge along an axis and has a second accommodating space. The first electrical connection element is at least partially located within the first accommodating space. The second electrical connection element is at least partially located within the second accommodating space and rotatably connected to the first electrical connection element along the axis.

In an embodiment of the invention, the first accommodating space and the second accommodating space are connected to each other and extend along the axis.

In an embodiment of the invention, the hinge structure adapted to be used in an electronic device, wherein the electronic device includes a first body, a second body, a first cable and a second cable, the first hinge and the second hinge are respectively fixed at the first body and the second body, the first cable is connected between the first body and the first electrical connection element, and the second cable is connected between the second body and the second electrical connection element.

The electronic device of the invention includes a first body, a second body, a first electrical connection element, a second electrical connection element, a first cable and a second cable. The second body is pivoted to the first body along an axis. The second electrical connection element is rotatably connected to the first electrical connection element along the axis. The first cable is connected between the first body and the first electrical connection element. The second cable is connected between the second body and the second electrical connection element.

In an embodiment of the invention, the electronic device further includes a first hinge and a second hinge respectively fixed at the first body and the second body and pivotally connected to each other along the axis, wherein the first electrical connection element and the second electrical connection element are located outside of the first hinge and the second hinge.

In an embodiment of the invention, the electronic device further includes a first hinge and a second hinge respectively fixed at the first body and the second body and pivotally connected to each other along the axis, wherein the first hinge has a first accommodating space, the second hinge has a second accommodating space, the first electrical connection element is at least partially located within the first accommodating space, and the second electrical connection element is at least partially located within the second accommodating space.

In an embodiment of the invention, the first body has an operating surface, and the axis is parallel to the operating surface.

In an embodiment of the invention, the first body has an operating surface, and the axis is perpendicular to the operating surface.

The hinge structure of the invention is adapted to be used in an electronic device. The electronic device includes a first body, a second body, a first cable and a second cable. The hinge structure includes a first hinge, a second hinge, a first electrical connection element and a second electrical connection element. The first hinge is fixed at the first body. The second hinge is fixed at the second body and pivoted to the first hinge along an axis. The second electrical connection element is rotatably connected to the first electrical connection element along the axis. The first cable is connected between the first body and the first electrical connection element, and the second cable is connected between the second body and the second electrical connection element.

In an embodiment of the invention, the first electrical connection element and the second electrical connection element are located outside of the first hinge and the second hinge.

In an embodiment of the invention, the first hinge has a first accommodating space, the second hinge has a second accommodating space, the first electrical connection element is at least partially located within the first accommodating space, and the second electrical connection element is at least partially located within the second accommodating space.

In an embodiment of the invention, the first electrical connection element and the second electrical connection element are respectively and rotatably disposed in the first accommodating space and the second accommodating space along the axis.

In an embodiment of the invention, the first electrical connection element and the second electrical connection element are respectively fixed at the first accommodating space and the second accommodating space.

In an embodiment of the invention, the first electrical connection element has a terminal, the second electrical connection element has an insertion hole, and the terminal is inserted into the insertion hole.

In view of the foregoing, in the hinge structure of the invention, the first hinge and the second hinge are pivotally connected to each other along the axis, the second electrical connection element is rotatably connected to the first electrical connection element along the axis, and the first cable and the second cable are connected with each other through the first electrical connection element and the second electrical connection element. As such, when the first body and the second body are to rotate in relative to each other through the first hinge and the second hinge, the first electrical connection element and the second electrical connection element may also rotate in relative to each other, so as to prevent the first cable and the second cable from being damaged or cracked due to being pulled, twisted or rubbed against other components during the process of rotating the first body and the second body in relative to each other, and thereby enhances a durability thereof.

In order to make the aforementioned and other features and advantages of the present application more comprehensible, several embodiments accompanied with figures are described in detail below.

BRIEF DESCRIPTION OF THE DRAWINGS

The accompanying drawings are included to provide a further understanding of the application, and are incorporated in and constitute a part of this specification. The drawings illustrate embodiments of the application and, together with the description, serve to explain the principles of the application.

FIG. 9A through.

DETAILED DESCRIPTION OF DISCLOSED EMBODIMENTS

Figure 1:
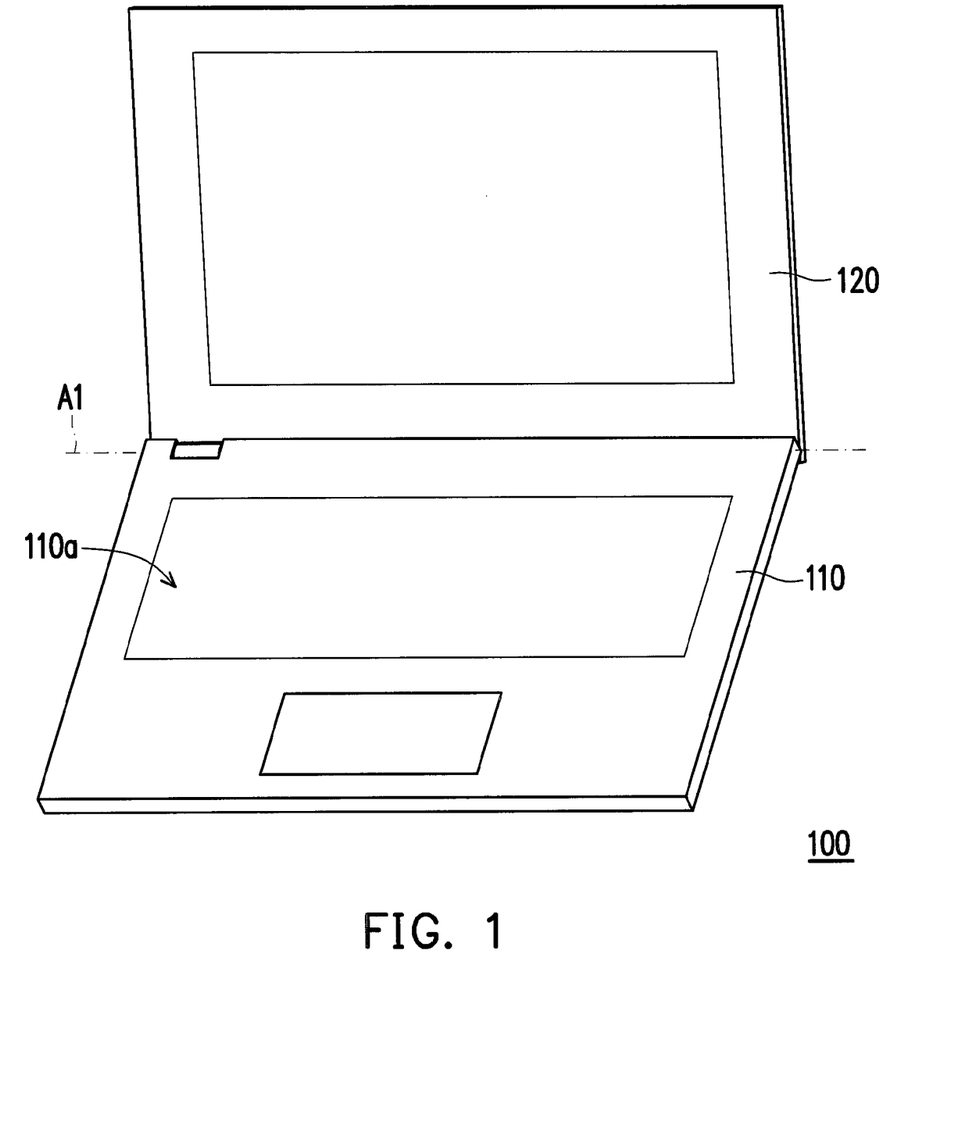
FIG. 1 is a perspective diagram illustrating an electronic device according to an embodiment of the invention.
Figure 2:
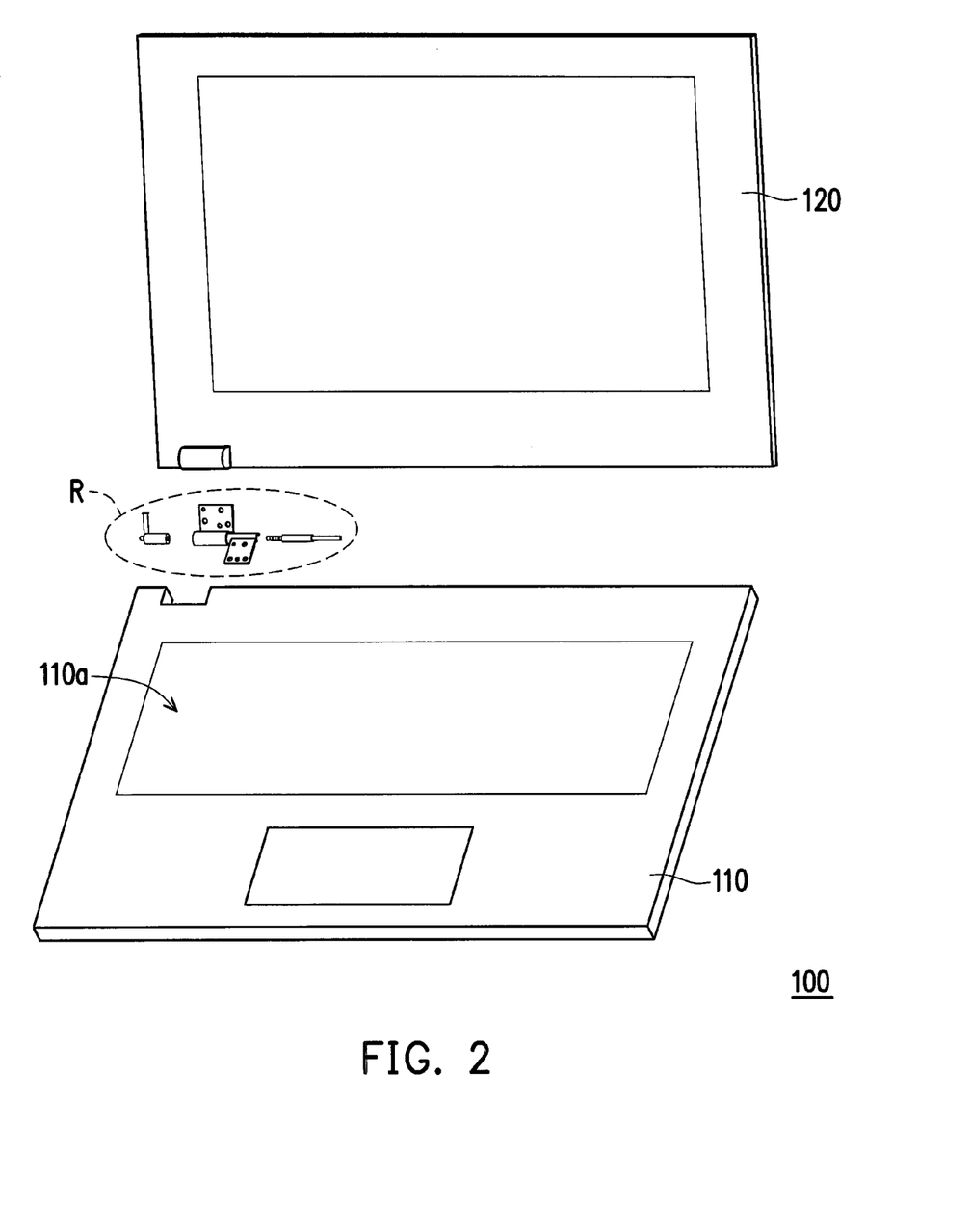
FIG. 2 is an explored diagram illustrating the electronic device depicted in FIG. 1.
Figure 3:
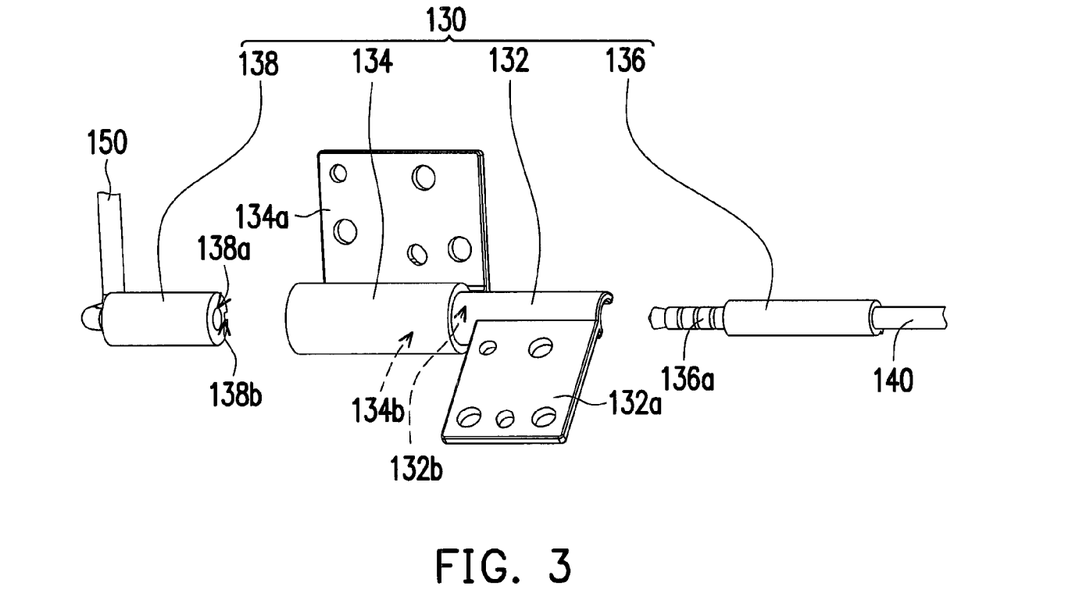
FIG. 3 is an enlarged view of a region R of the electronic device depicted in FIG. 2.

FIG. 1 is a perspective diagram illustrating an electronic device according to an embodiment of the invention. FIG. 2 is an explored diagram illustrating the electronic device depicted in FIG. 1. FIG. 3 is an enlarged view of a region R of the electronic device depicted in FIG. 2. Referring to FIG. 1 through FIG. 3, an electronic device 100 of the present embodiment, for example, is a notebook computer, and includes a first body 110, a second body 120, a hinge structure 130, a first cable 140 and a second cable 150. The first body 110 and the second body 120, for example, are respectively a host and a display of the notebook computer, and the second body 120 is pivoted to the first body 110 along an axis A1 through the hinge structure 130.

Figure 4:
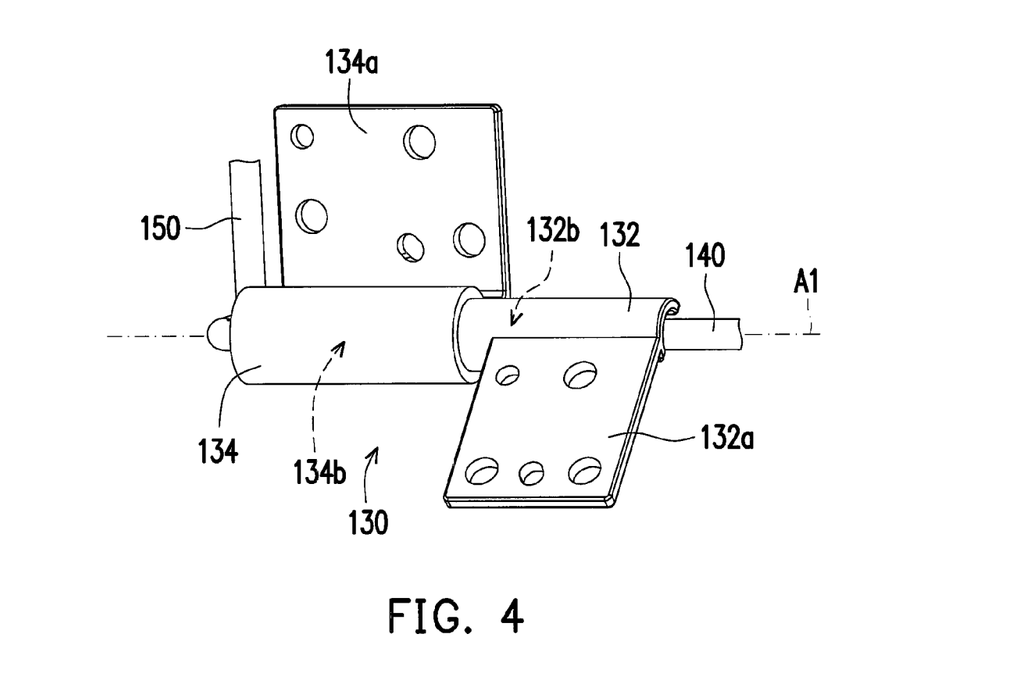
FIG. 4 illustrates a first electrical connection element and a second electrical connection element depicted in FIG. 3 being respectively located within a first hinge and a second hinge.
Figure 5:
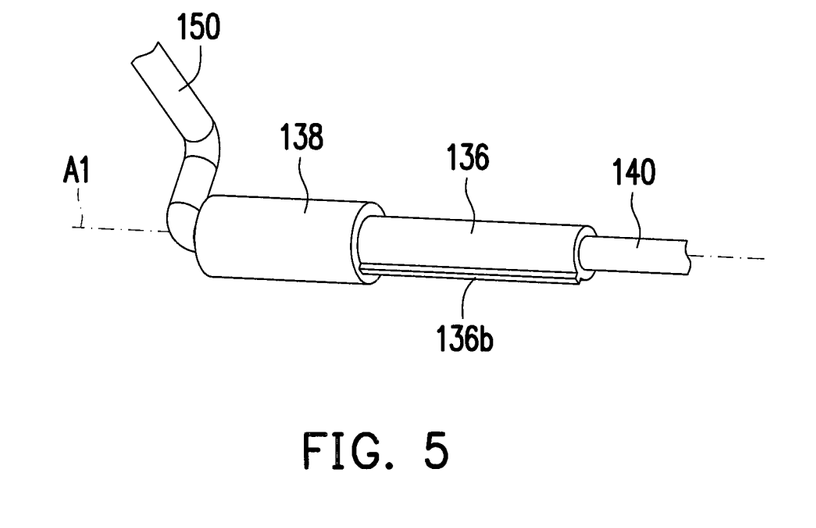
FIG. 5 is a perspective diagram illustrating the first electrical connection element and the second electrical connection element depicted in FIG. 4.
Figure 6:
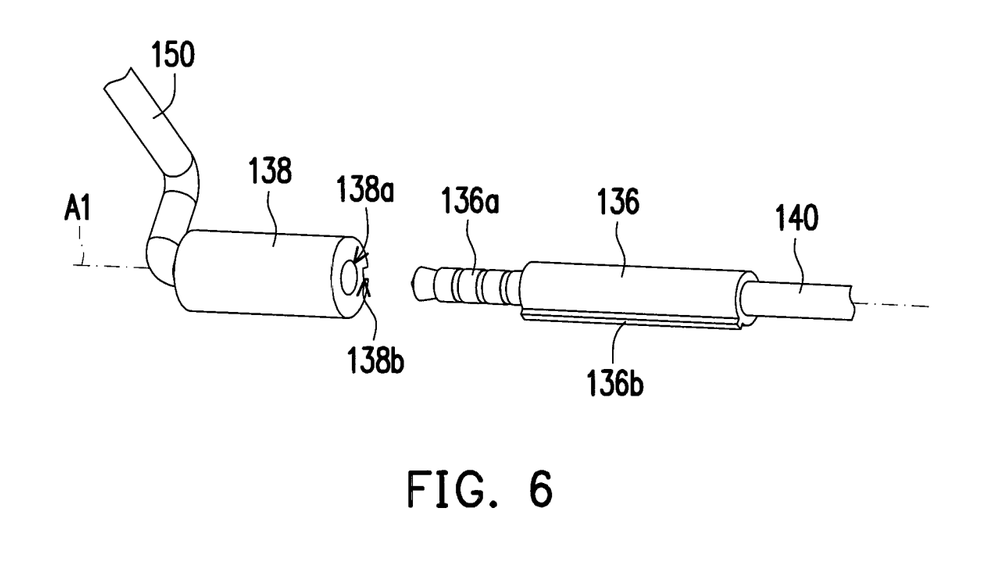
FIG. 6 is an exploded diagram illustrating the first electrical connection element and the second electrical connection element depicted in FIG. 5.

FIG. 4 illustrates a first electrical connection element and a second electrical connection element depicted in FIG. 3 being respectively located within a first hinge and a second hinge. FIG. 5 is a perspective diagram illustrating the first electrical connection element and the second electrical connection element depicted in FIG. 4. FIG. 6 is an exploded diagram illustrating the first electrical connection element and the second electrical connection element depicted in FIG. 5. Referring to FIG. 3 through FIG. 6, in detail, the hinge structure 130 includes a first hinge 132, a second hinge 134, a first electrical connection element 136 and a second electrical connection element 138. The first hinge 132 is fixed at the first body 110 shown in FIG. 1 and FIG. 2 via a fixing portion 132a thereof, the second hinge 134 is fixed at the second body 120 shown in FIG. 1 and FIG. 2 via a fixing portion 134a thereof, and the second hinge 132 is pivoted to the first hinge 134 along the axis A1. Wherein, the first hinge 132 may also be fixed at the second body 120 depending on the needs, while the second hinge 132 may be fixed at the first body 110 depending on actual configuration requirements.

Partial structure of the first hinge 132 is a hollow cylinder, and the first hinge 132 has a first accommodating space 132b. Partial structure of the second hinge 134 is a hollow cylinder, and the second hinge 134 has a second accommodating space 134b. The first accommodating space 132b and the second accommodating space 134b are connected to each other and extend along the axis A1. The first electrical connection element 136 is at least partially located within the first accommodating space 132b and has a terminal 136, the second electrical connection element 138 is at least partially located within the second accommodating space 134b and has an insertion hole 138a, and the terminal 136a is inserted into the insertion hole 138a to enable the second electrical connection element 138 to be rotatably connected to the first electrical connection element 136 along the axis A1. The first cable 140 is connected between the first body 110 and the first electrical connection element 136, and the second cable 150 is connected between the second body 120 and the second electrical connection element 138, so that the first body 110 is electrically connected to the second body 120 through the first cable 140, the first electrical connection element 136, the second electrical connection element 138 and the second cable 150.

Figure 7:
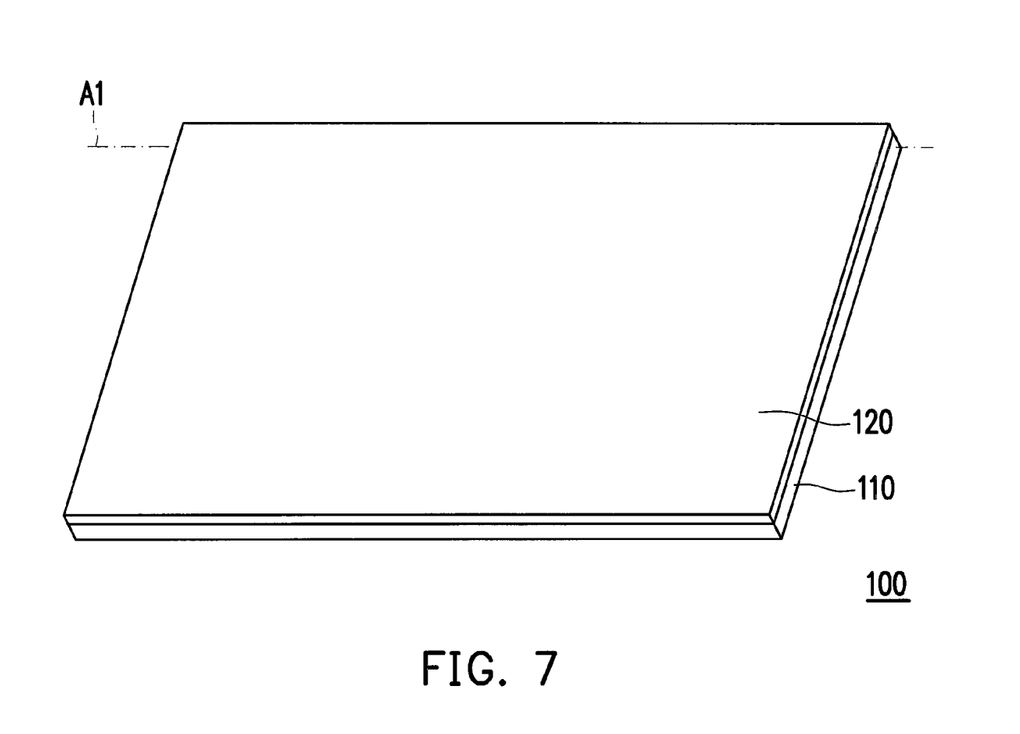
FIG. 7 is a perspective diagram illustrating a second body depicted in FIG. 1 closed on a first body.
Figure 8:
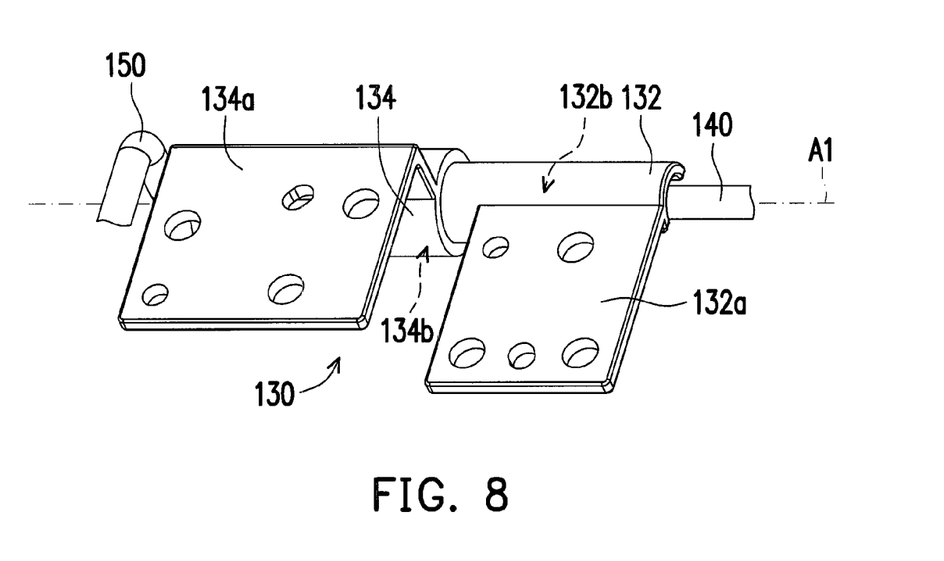
FIG. 8 is a schematic diagram illustrating the second hinge depicted in FIG. 4 rotating in relative to the first hinge.
Figure 9A:
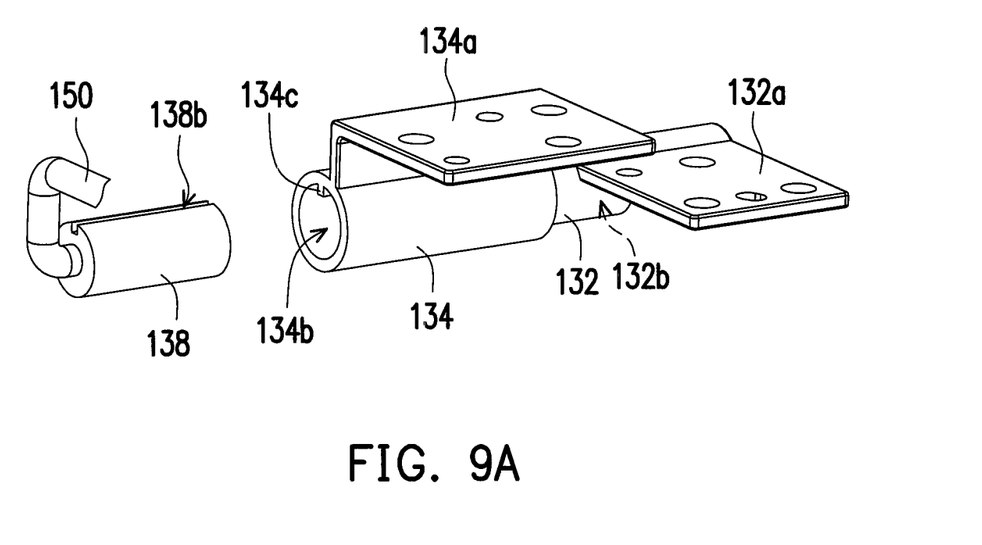
Figure 9B:
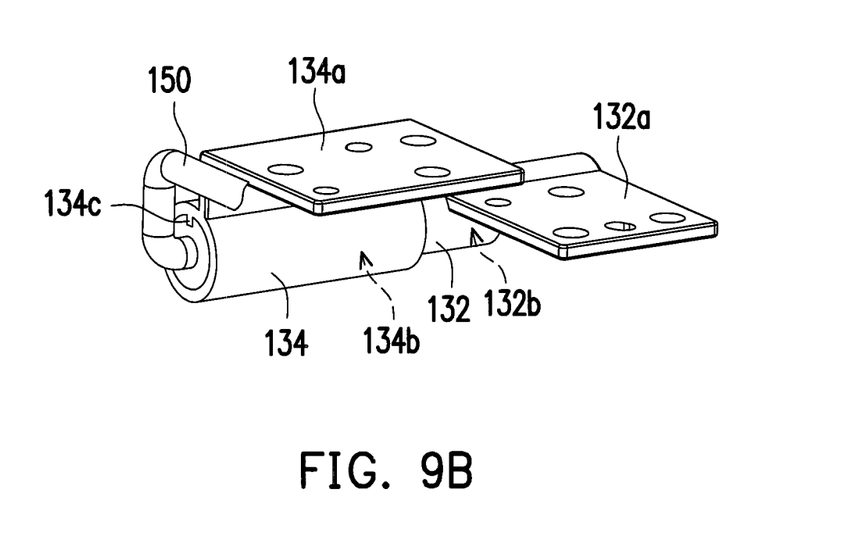
Figure 9C:
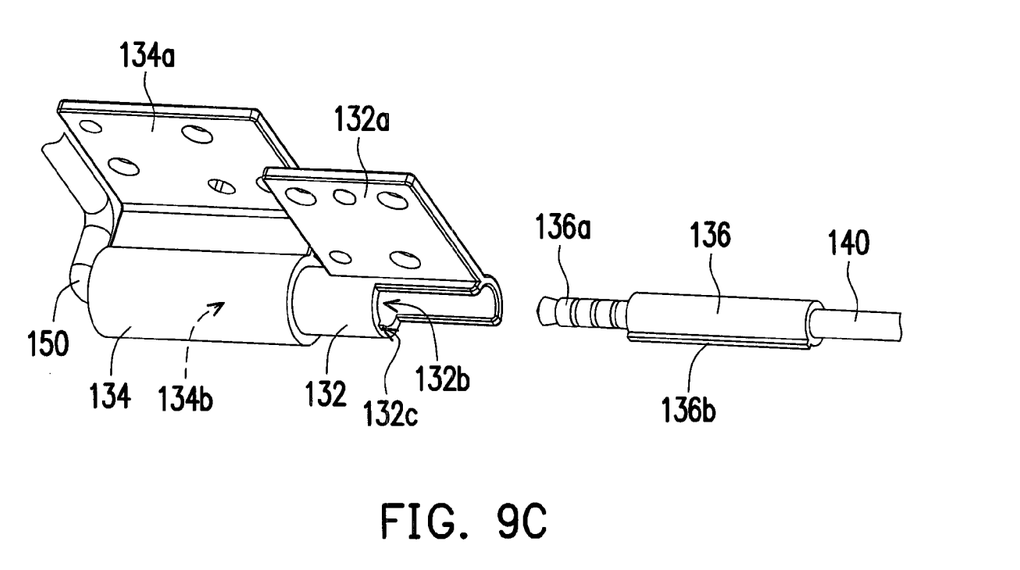
Figure 9D:
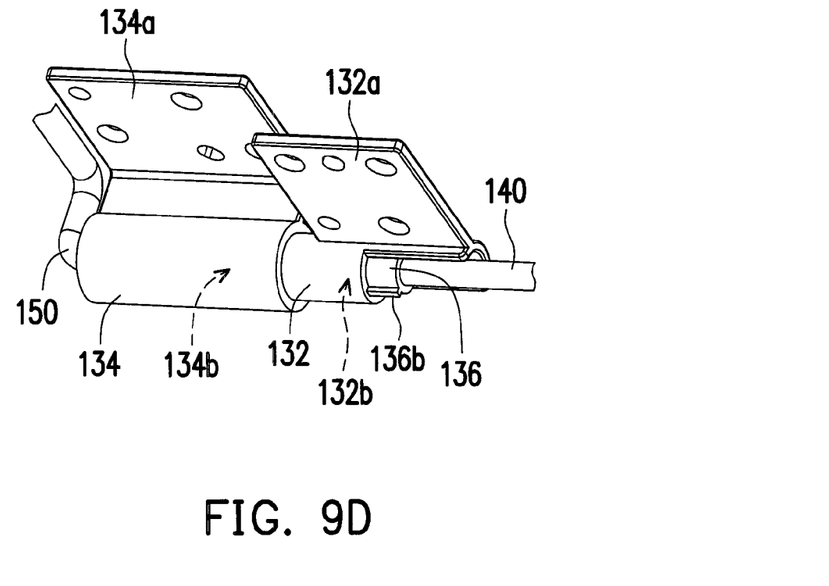
FIG. 9D are assembly flow diagrams illustrating the first electrical connection element and the second electrical connection element depicted in FIG. 3.

FIG. 7 is a perspective diagram illustrating a second body depicted in FIG. 1 closed on a first body. FIG. 8 is a schematic diagram illustrating the second hinge depicted in FIG. 4 rotating in relative to the first hinge. Under the abovementioned configuration, since the first electrical connection element 136 and the second electrical connection element 138 may rotatably be connected with each other along the axis A1, when a user is to close the second body 120 onto the first body 110, as shown in FIG. 7, for enabling the first hinge 132 and the second hinge 134 to rotate in relative to each other from a state shown in FIG. 4, along the axis A1, to a state shown in FIG. 8, the first electrical connection element 136 and the second electrical connection element 138 may also rotate in relative to each other, so as to prevent the first cable 140 and the second cable 150 from being damaged or cracked due to being pulled, twisted or rubbed against other components during the process of rotating the first body 110 and the second body 120 in relative to each other, and thereby enhances a durability thereof FIG. 9A through FIG. 9D are assembly flow diagrams illustrating the first electrical connection element and the second electrical connection element depicted in FIG. 3. In the process of assembling the first electrical connection element 136 and the second electrical connection element 138, the second electrical connection element 138 may firstly be placed in the second accommodating space 134b of the second hinge 134, as shown in FIG. 9A to FIG. 9B, then the first electrical connection element 136 may be placed in the first accommodating space 132b of the first hinge 132, as shown in FIG. 9C to FIG. 9D, and the terminal 136a of the first electrical connection element 136 may be inserted into the insertion hole 138a (labeled in FIG. 6) of the second electrical connection element 138. As in the aforementioned assembling process, by merely enabling the first electrical connection element 136 and the second electrical connection element 138 to be respectively placed in the first accommodating space 132b of the first hinge 132 and the second accommodating space 134b of the second hinge 134 and enabling the first electrical connection element 136 and the second electrical connection element 138 to be connected with each other, fixing of the first cable 140 and the second cable 150 at the hinge structure 130 may be completed, and thus the hinge structure 130 of the present embodiment may simplify the assembly of the first cable 140 and the second cable 150.

Referring to FIG. 5, FIG. 6, FIG. 9C and FIG. 9D, in the present embodiment, the first electrical connection element 136 has a positioning rib 136b, the first hinge 132 has a positioning slot 132c, and the positioning rib 136b is engaged to the positioning slot 132c so as to enable the first electrical connection element 136 to be fixed at the first accommodating space 132b of the first hinge 132. Referring to FIG. 3, FIG. 6, FIG. 9A and FIG. 9B, similarly, the second electrical connection element 138 has a positioning slot 138b, the second hinge 134 has a positioning rib 134c, and the positioning rib 134c is engaged to the positioning slot 138b so as to enable the second electrical connection element 138 to be fixed at the second accommodating space 134b of the second hinge 134. By respectively fixing the first electrical connection element 136 and the second electrical connection element 138 at the first accommodating space 132b and second accommodating space 134b, as mentioned in above, the first electrical connection element 136 and the first cable 140 may rotate with the first hinge 132 and the first body 110, and the second electrical connection element 138 and the second cable 150 may rotate with the second hinge 134 and the second body 120, so that the first hinge 132 and the first body 110 are prevented from causing wear and tear to the first cable 140, and the second hinge 134 and the second body 120 are prevented from causing wear and tear to the second cable 150. In other embodiments, the first electrical connection element 136 and the second electrical connection element 138 may also be respectively fixed within the first accommodating space 132b and the second accommodating space 134b via structures of other appropriate forms, the invention is not limited thereto. In addition, the first electrical connection element 136 and the second electrical connection element 138, instead of being fixed within the first accommodating space 132b and the second accommodating space 134b, may also respectively and rotatably be disposed within the first accommodating space 132b and the second accommodating space 134b along the axis A1.

Figure 10:
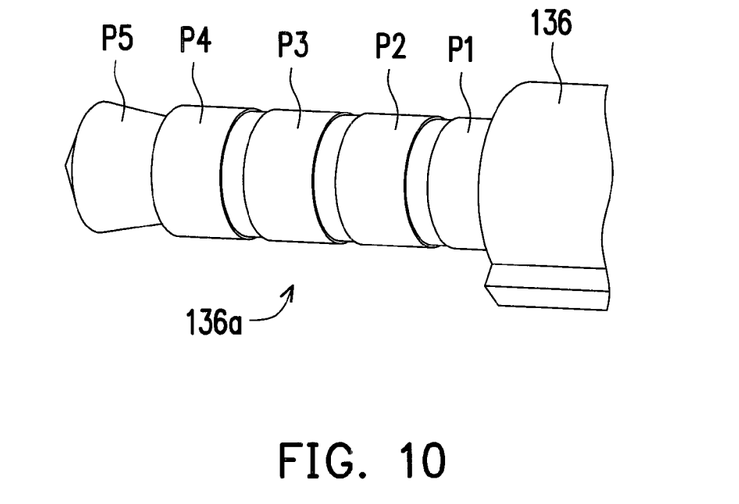
FIG. 10 is a partial enlarged view of the first electrical connection element depicted in FIG. 3.

FIG. 10 is a partial enlarged view of the first electrical connection element depicted in FIG. 3. Referring to FIG. 10, in the present embodiment, the terminal 136a of the first electrical connection element 136, for example, has five contacting portions P1 to P5 respectively configured to contact five contracting points (not shown) within the second electrical connection element 138 shown in FIG. 3, so as to perform five different types of single transmission. Furthermore, one of the five contacting portions P1 to P5 may be configured to execute a switching function for switching the other four contacting portions, so as to increase the types of signal transmission for the terminal 136a. For instance, the contracting portion P1 may be configured to execute the switching function, so that the other four contacting portions P2 to P5 may be switched by the contracting portion P1 into a first state or a second state. The four contacting portions P2 to P5 may perform four different types of signal transmission in the first state and four other different types of signal transmission in the second state, so that the terminal 136a can perform eight different types of signal transmission under the condition of not increase the contacting portion. In addition, a control circuit is configured within the electronic device 100 for switching the states of the contracting portions of the terminal 136a, so as to increase the types of signal transmission for the terminal 136a, as mentioned in above.

Figure 11:
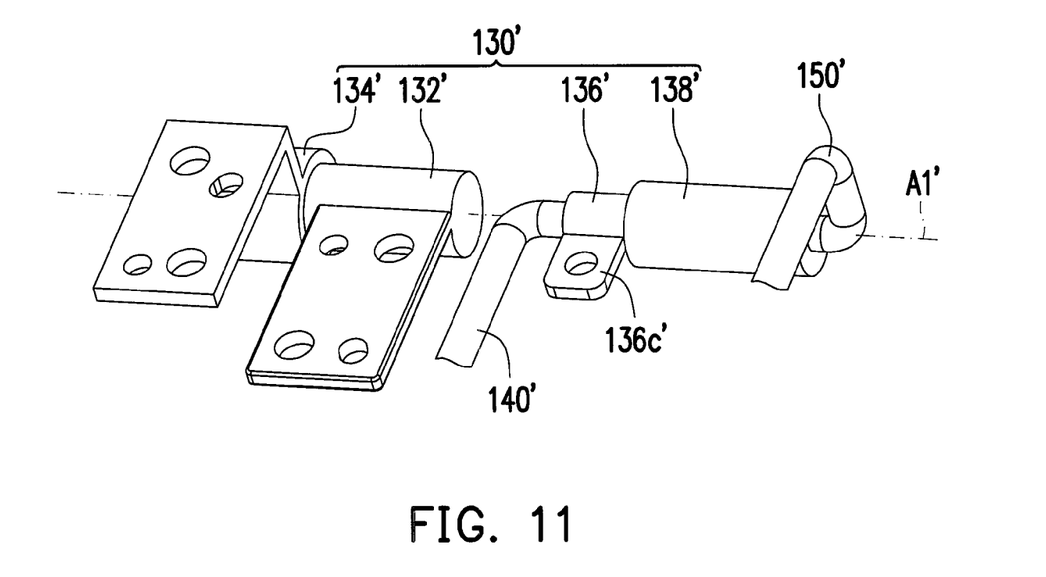
FIG. 11 is a schematic diagram illustrating a hinge structure and a cable according to another embodiment of the invention.

The invention is not intended to limit the configuration positions of the first electrical connection element and the second electrical connection element, and specific details accompanied by drawing are provided in the following. FIG. 11 is a schematic diagram illustrating a hinge structure and a cable according to another embodiment of the invention. Referring to FIG. 11, in a hinge structure 130' of the present embodiment, a first hinge 132' and a second hinge 134' are pivotally connected to each other along an axis A1', a first cable 140' and a second cable 150' are respectively connected to a first electrical connection element 136' and a second electrical connection element 138', the first electrical connection element 136' and the second electrical connection element 138' may rotatably be connected with each other along the axis A1', and thus when the first hinge 132' and the second hinge 134' are to rotate in relative to each other along the axis A1', the first electrical connection element 136' and the second electrical connection element 138' may also rotate in relative to each other, so as to prevent the first cable 140' and the second cable 150' from being damaged or cracked due to being pulled, twisted or rubbed against the other components during the process of rotating the first hinge 132' and the second hinge 134' in relative to each other. The aforementioned configuration and function of the hinge structure 130' are similar to the configuration and functions of the hinge structure 130 shown in FIG. 3. Differences between the hinge structure 130' and the hinge structure 130 are that, the first hinge 132' and the second hinge 134' are both solid structures and have no accommodating space, and the first electrical connection element 136' and the second electrical connection element 138' are located outside of the first hinge 132' and the second hinge 134'. The first electrical connection element 136', for example, is fixed at the body of the electronic device through the fixing portion 136c' thereof, and the second electrical connection element 138' is inserted into the first electrical connection element 136' for fixing the second electrical connection element 138' into position.

Figure 12:
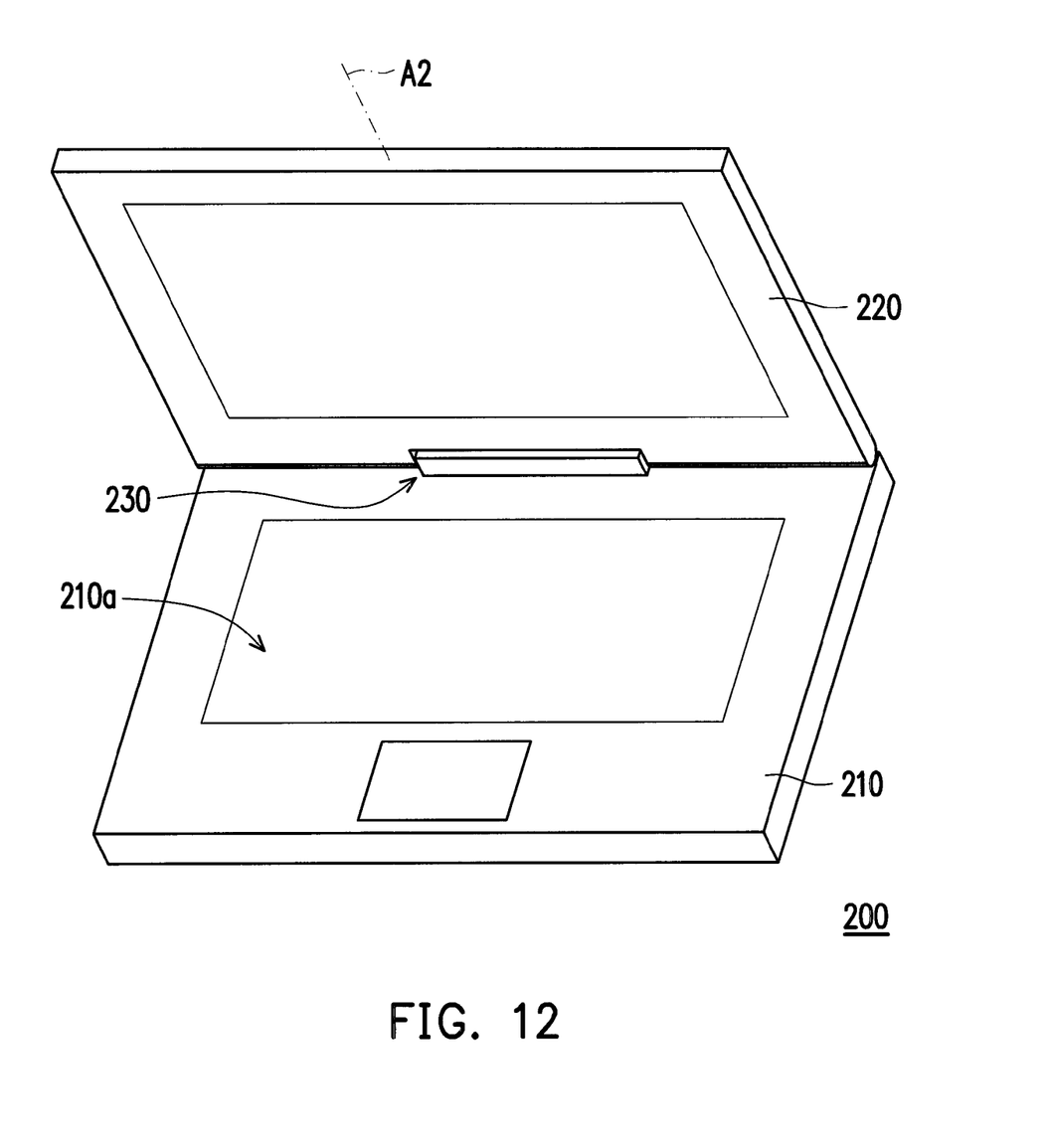
FIG. 12 is a perspective diagram illustrating an electronic device according to another embodiment of the invention.
Figure 13:
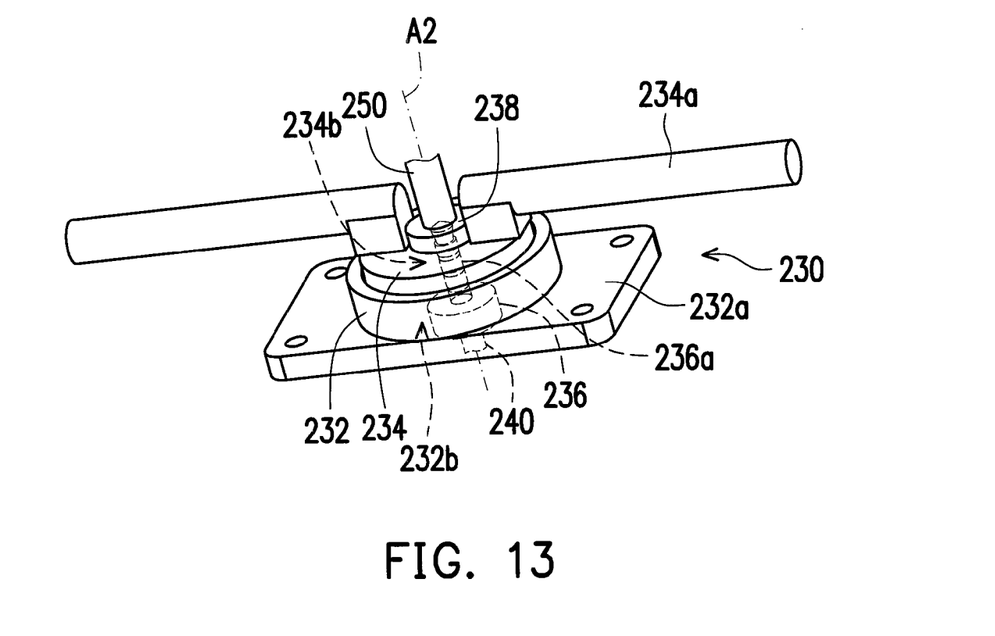
FIG. 13 is a perspective diagram illustrating a hinge structure and a cable of the electronic device depicted in FIG. 12.
Figure 14:
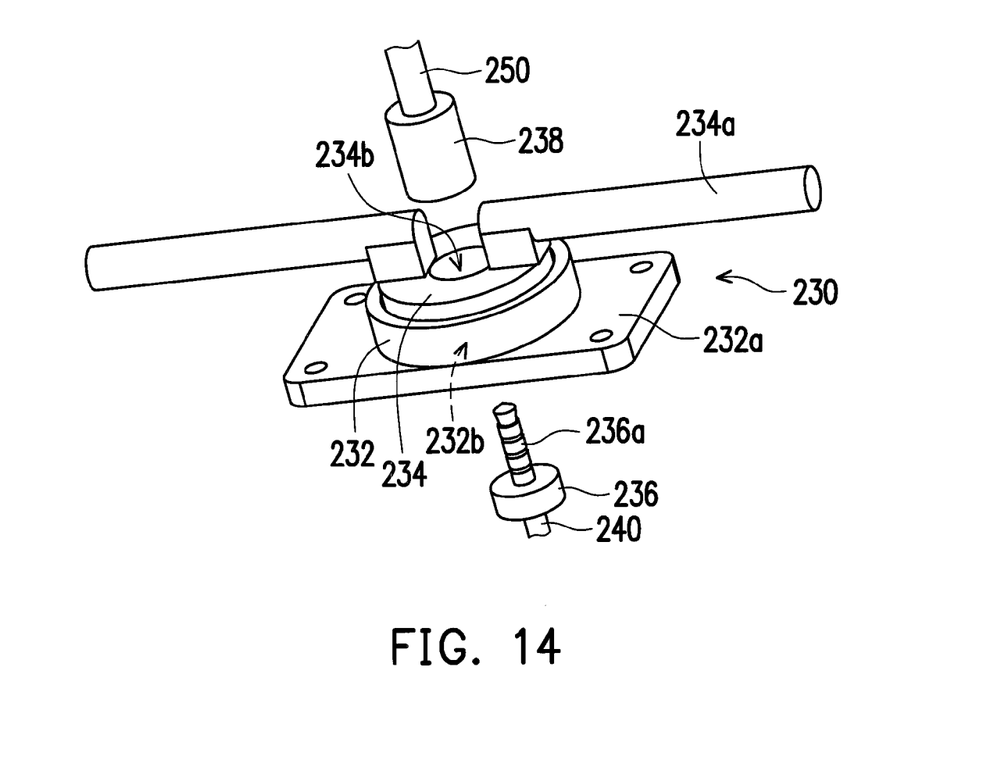
FIG. 14 is an exploded diagram illustrating the hinge structure and the cable depicted in FIG. 12.
Figure 15:
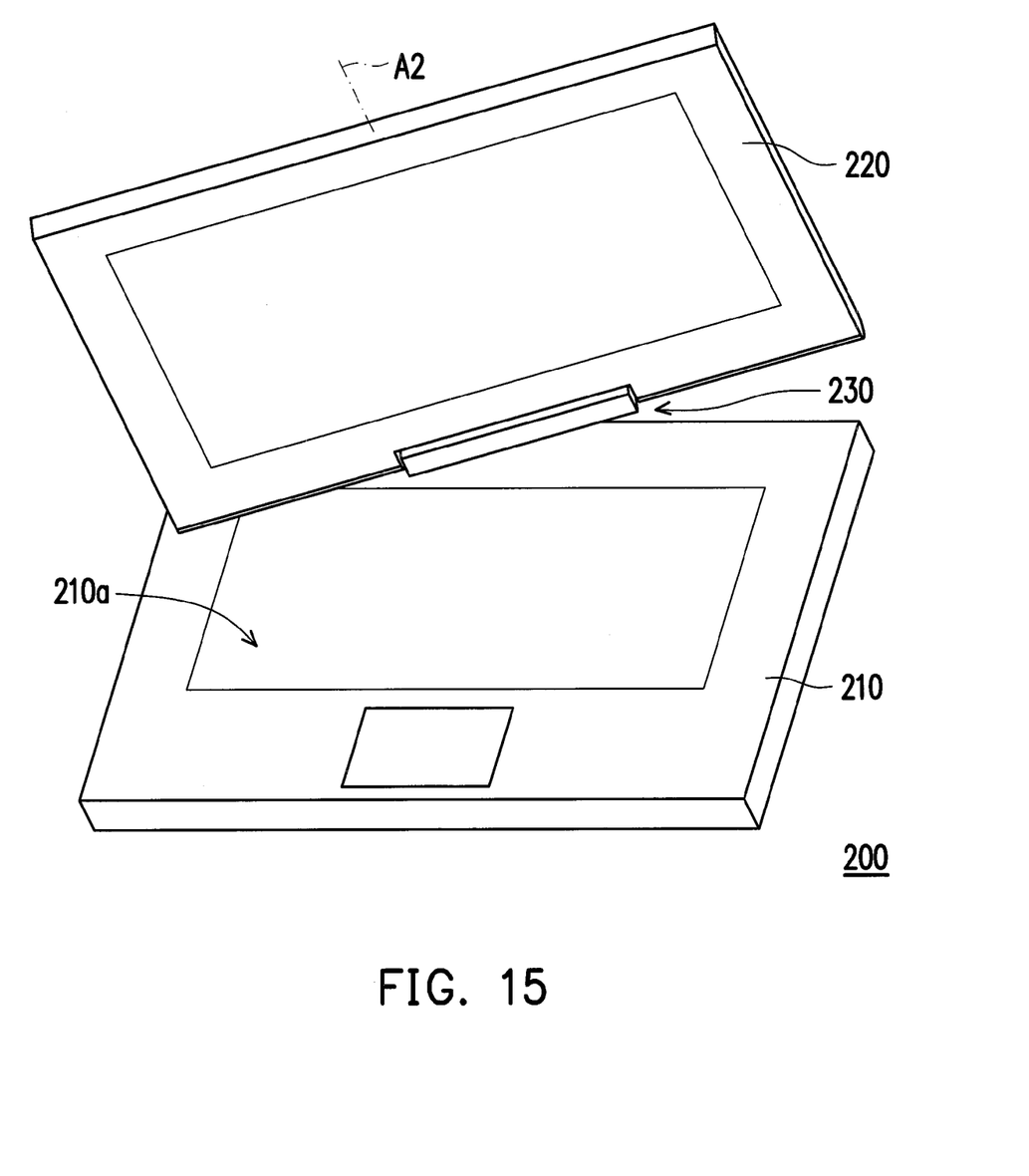
FIG. 15 is a schematic diagram illustrating a second body depicted in FIG. 12 rotating in relative to a first body.

FIG. 12 is a perspective diagram illustrating an electronic device according to another embodiment of the invention. FIG. 13 is a perspective diagram illustrating a hinge structure and a cable of the electronic device depicted in FIG. 12. FIG. 14 is an exploded diagram illustrating the hinge structure and the cable depicted in FIG. 12. FIG. 15 is a schematic diagram illustrating a second body depicted in FIG. 12 rotating in relative to a first body. In an electronic device 200 shown in FIG. 12, a first body 210 and a second body 220 are not being opened or closed in relative to each other through the hinge structure 230; instead, the second body 220, as under the condition of being opened, as shown in FIG. 15, rotates in relative to the first body 210 along an axis A2 through hinge structure 230, wherein the axis A2 is perpendicular to an operating surface 210a of the first body 210, and is different from the axis A1 (which is parallel to the operating surface 110a of the first body 110 shown in FIG. 1). Descriptions regarding the configuration of the hinge structure 230 are provided in detail below.

Similar to the hinge structure 130 shown in FIG. 3, the hinge structure 230 of the present embodiment includes a first hinge 232, a second hinge 234, a first electrical connection element 236 and a second electrical connection element 238. The first hinge 232 is fixed at the first body 210 shown in FIG. 12 and FIG. 15 via a fixing portion 232a, the second hinge 234 is fixed at the second body 220 shown in FIG. 12 and FIG. 15 via a fixing portion 234a thereof, and the second hinge 232 is pivoted to the first hinge 232 along the axis A2. Partial structure of the first hinge 232 is hollow and has a first accommodating space 232b, partial structure of the second hinge 234 is hollow and has a second accommodating space 234b, and the first accommodating space 232b and the second accommodating space 234b are connected to each other and extend along the axis A2. The first electrical connection element 236 is at least partially located within the first accommodating space 232b and has a terminal 236a, the second electrical connection element 238 is at least partially located within the second accommodating space 234b and has a insertion hole (not shown), and the terminal 236a is inserted into the insertion hole of the second electrical connection element 238 so as to enable the second electrical connection element 238 to be rotatably connected to the first electrical connection element 236 along the axis A2. The first cable 240 is connected between the first body 210 and the first electrical connection element 236, and the second cable 250 is connected between the second body 220 and the second electrical connection element 238, so that the first body 210 is electrically connected to the second body 220 through the first cable 240, the first electrical connection element 236, the second electrical connection element 238 and the second cable 250.

Under the abovementioned configuration, since the first electrical connection element 236 and the second electrical connection element 238 may rotatably be connected with each other along the axis A2, when the user is to rotate the second body 220 along the axis A2 as being shown in FIG. 15 to enable the first hinge 232 and the second hinge 234 to rotate in relative to each other, the first electrical connection element 236 and the second electrical connection element 238 may also rotate in relative to each other, so as to prevent the first cable 240 and the second cable 250 from being damaged or cracked due to being pulled, twisted or rubbed against other components during the process of rotating the second body 220, and thereby allows the second body 220 to rotate at 360 degrees along the axis A2 without causing damage and crack to the first cable 240 and the second cable 250.

In summary, in the hinge structure of the invention, the first hinge and the second hinge are pivotally connected to each other along the axis, the second electrical connection element is rotatably connected to the first electrical connection element along the axis, and the first cable and the second cable are connected with each other through the first electrical connection element and the second electrical connection element. As such, when the first body and the second body are to rotate in relative to each other through the first hinge and the second hinge, the first electrical connection element and the second electrical connection element may also rotate in relative to each other, so as to prevent the first cable and the second cable from being damaged or cracked due to being pulled, twisted or rubbed against the other components during the process of rotating the first body and the second body in relative to each other, and thereby enhances a durability thereof. In addition, the first hinge and the second hinge may be designed as hollow cylinders; and therefore, by merely enabling the first electrical connection element and the second electrical connection element to be respectively placed in the first accommodating space of the first hinge and the second accommodating space of the second hinge and enabling the first electrical connection element and the second electrical connection element to be connected with each other, the fixing of the first cable and the second cable at the hinge structure may be completed, thereby simplifying the assembly of the first cable and the second cable.

It will be apparent to those skilled in the art that various modifications and variations can be made to the structure of the application without departing from the scope or spirit of the application. In view of the foregoing, it is intended that the application cover modifications and variations of this application provided they fall within the scope of the following claims and their equivalents.

What is claimed is:

1. A hinge structure comprising:
    a first hinge having a first accommodating space;
    a second hinge pivoted to the first hinge along an axis and having a second accommodating space;
    a first electrical connection element at least partially located within the first accommodating space; and
    a second electrical connection element at least partially located within the second accommodating space and rotatably connected to the first electrical connection element along the axis.

2. The hinge structure as recited in claim 1, wherein the first electrical connection element and the second electrical connection element are respectively and rotatably disposed in the first accommodating space and the second accommodating space along the axis.

3. The hinge structure as recited in claim 1, wherein the first electrical connection element and the second electrical connection element are respectively fixed at the first accommodating space and the second accommodating space.

4. The hinge structure as recited in claim 1, wherein the first electrical connection element has a terminal, the second electrical connection element has an insertion hole, and the terminal is inserted into the insertion hole.

5. The hinge structure as recited in claim 1, wherein the first accommodating space and the second accommodating space are connected to each other and extend along the axis.

6. The hinge structure as recited in claim 1 adapted to be used in an electronic device, wherein the electronic device comprises a first body, a second body, a first cable and a second cable, the first hinge and the second hinge are respectively fixed at the first body and the second body, the first cable is connected between the first body and the first electrical connection element, and the second cable is connected between the second body and the second electrical connection element.

7. An electronic device comprising:
   a first body;
   a second body pivoted to the first body along an axis;
   a first electrical connection element;
   a second electrical connection element rotatably connected to the first electrical connection element along the axis;
   a first cable connected between the first body and the first electrical connection element; and
   a second cable connected between the second body and the second electrical connection element.

8. The electronic device as recited in claim 7 further comprising a first hinge and a second hinge respectively fixed at the first body and the second body and pivotally connected to each other along the axis, wherein the first electrical connection element and the second electrical connection element are located outside of the first hinge and the second hinge.

9. The electronic device as recited in claim 7 further comprising a first hinge and a second hinge respectively fixed at the first body and the second body and pivotally connected to each other along the axis, wherein the first hinge has a first accommodating space, the second hinge has a second accommodating space, the first electrical connection element is at least partially located within the first accommodating space, and the second electrical connection element is at least partially located within the second accommodating space.

10. The electronic device as recited in claim 9, wherein the first electrical connection element and the second electrical connection element are respectively and rotatably disposed in the first accommodating space and the second accommodating space along the axis.

11. The electronic device as recited in claim 9, wherein the first electrical connection element and the second electrical connection element are respectively fixed at the first accommodating space and the second accommodating space.

12. The electronic device as recited in claim 7, wherein the first electrical connection element has a terminal, the second electrical connection element has an insertion hole, and the terminal is inserted into the insertion hole.

13. The electronic device as recited in claim 7, wherein the first body has an operating surface, and the axis is parallel to the operating surface.

14. The electronic device as recited in claim 7, wherein the first body has an operating surface, and the axis is perpendicular to the operating surface.

15. A hinge structure adapted to be used in an electronic device, the electronic device comprising a first body, a second body, a first cable and a second cable, the hinge structure comprising:
   a first hinge fixed at the first body;
   a second hinge fixed at the second body and pivoted to the first hinge along an axis;
   a first electrical connection element, wherein the first cable is connected between the first body and the first electrical connection element; and
   a second electrical connection element rotatably connected to the first electrical connection element along the axis, wherein the second cable is connected between the second body and the second electrical connection element.

16. The hinge structure as recited in claim 15, wherein the first electrical connection element and the second electrical connection element are located outside of the first hinge and the second hinge.

17. The hinge structure as recited in claim 15, wherein the first hinge has a first accommodating space, the second hinge has a second accommodating space, the first electrical connection element is at least partially located within the first accommodating space, and the second electrical connection element is at least partially located within the second accommodating space.

18. The hinge structure as recited in claim 17, wherein the first electrical connection element and the second electrical connection element are respectively and rotatably disposed in the first accommodating space and the second accommodating space along the axis.

19. The hinge structure as recited in claim 17, wherein the first electrical connection element and the second electrical connection element are respectively fixed at the first accommodating space and the second accommodating space.

20. The hinge structure as recited in claim 15, wherein the first electrical connection element has a terminal, the second electrical connection element has an insertion hole, and the terminal is inserted into the insertion hole.

\* \* \* \* \*